(12) United States Patent
Cavett

(10) Patent No.: US 6,814,660 B1
(45) Date of Patent: Nov. 9, 2004

(54) HVAC LOCALIZED AIR FILTER ASSEMBLY SYSTEM

(76) Inventor: Curtis D. Cavett, 1216 S. Duff P.O. Box 8, Mitchell, SD (US) 57301

(*) Notice: Subject to any disclaimer, the term of this patent is extended or adjusted under 35 U.S.C. 154(b) by 0 days.

(21) Appl. No.: 10/379,199

(22) Filed: Mar. 4, 2003

Related U.S. Application Data

(60) Provisional application No. 60/364,076, filed on Mar. 15, 2002.

(51) Int. Cl.[7] .................................................. F24F 7/00
(52) U.S. Cl. ........................ 454/284; 454/291; 55/490
(58) Field of Search ............................... 454/289, 291, 454/284, 337, 328, 309; 55/480, 481, 486, 490

(56) References Cited

U.S. PATENT DOCUMENTS

| | | | |
|---|---|---|---|
| 450,322 A | 4/1891 | Segal | |
| 1,801,949 A | 4/1931 | Broudy et al. | |
| 2,203,311 A | 6/1940 | Sinclair | |
| 5,176,570 A | 1/1993 | Liedl | |
| 5,356,334 A | * 10/1994 | Gray | 454/51 |
| 5,472,380 A | 12/1995 | Sarazen, Jr. et al. | |
| 5,525,145 A | 6/1996 | Hodge | |
| 5,597,392 A | 1/1997 | Hawkins et al. | |
| 5,766,285 A | 6/1998 | Killman | |
| 5,863,310 A | * 1/1999 | Brown et al. | 55/480 |
| 5,947,815 A | 9/1999 | Danforth | |
| 5,984,776 A | 11/1999 | Berger | |
| 6,030,427 A | 2/2000 | Sorice et al. | |
| 6,234,893 B1 | 5/2001 | Meredith | |
| 6,241,603 B1 | 6/2001 | Watson | |
| 6,257,976 B1 | 7/2001 | Richardson, III | |
| 6,379,412 B1 | 4/2002 | Porterfield | |

* cited by examiner

Primary Examiner—Derek S. Boles

(57) ABSTRACT

A heating ventilation and cooling (HVAC) localized air filter assembly system for capturing particulate material and contaminants distributed through HVAC systems. The system includes a least one frame assembly positionable over a HVAC duct and having a front wall and a perimeter wall extending from the front wall. The front wall has at least one opening for facilitating airflow through said frame assembly. Additionally, at least one filter assembly is positionable within the at least one frame assembly. The filter assembly is designed for capturing particulate matter in ambient air being conducted through the HVAC duct.

19 Claims, 7 Drawing Sheets

HVAC LOCALIZED AIR FILTER ASSEMBLY SYSTEM

This application claims the benefit of U.S. Provisional Application No. 60/364,076, filed Mar. 15, 2002.

BACKGROUND OF THE INVENTION

1. Field of the Invention

The present invention relates to air filters and more particularly pertains to a new Heating Ventilation and Cooling (HVAC) localized air filter assembly system for capturing particulate material and contaminants distributed through HVAC systems.

2. Description of the Prior Art

The use of air filters is known in the prior art. U.S. Pat. No. 5,984,776 describes a decorative device with a damper assembly, faceplate, and filter. However, the filter is positioned prior to the damper assembly. This placement does not allow for the protection of the filter assembly from abrasion from a back side when the vent assembly is removed from duct of the HVAC system. Another type of air filters is U.S. Pat. No. 6,030,427 having a filter assembly requiring the removal of the faceplate from the adjacent wall to access the filter assembly.

While these devices fulfill their respective, particular objectives and requirements, the need remains for a system that has certain improved features including ready access to the filter assembly without manipulation of the frame assembly, protection of the filter assembly by positioning the filter assembly between the grate assembly and the louver assembly, and includes a monitoring system to assure good system efficiency.

SUMMARY OF THE INVENTION

The present invention meets the needs presented above by providing an edge access for all register, vent, duct, and return configurations allowing the filter assembly to be slidably removed from the frame assembly.

An object of the present invention is to improve system efficiency off HVAC system by preventing buildup of particulate material and debris within the duct system.

Another object of the present invention is to provide a new HVAC localized air filter assembly system that improves the air quality within a structure by effectively capturing particulate materials and contaminants circulated by the HVAC system.

Still another object of the present invention is to provide a new HVAC localized air filter assembly system that includes a monitoring function to maintain system efficiency by indicating when it is appropriate to change individual filter members.

Yet another object of the present invention is to provide a scalable system which can provided significant improvements in air quality with incorporation of a single filter into a HVAC system, and further improve air quality with the use of multiple filters, each of which being associated with a single register or vent.

To this end, the present invention generally comprises at least one frame assembly positionable over a heating ventilation and cooling (HVAC) duct and having a front wall and a perimeter wall extending from the front wall. The front wall has at least one opening for facilitating airflow through said frame assembly. Additionally, at least one filter assembly is positionable within the at least one frame assembly. The filter assembly is designed for capturing particulate matter in ambient air being conducted through the HVAC duct.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
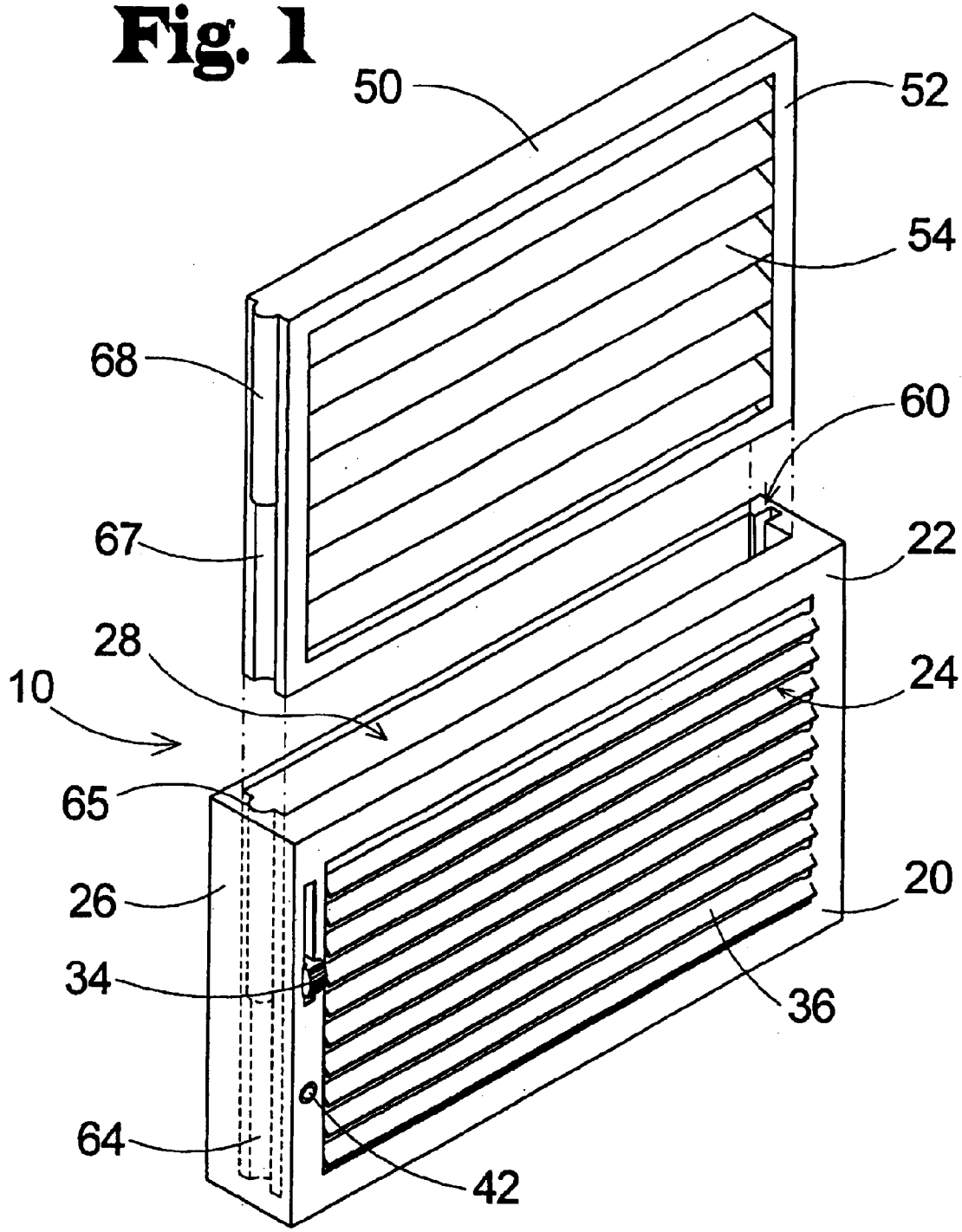
FIG. 1 is a schematic perspective front view of a new HVAC localized air filter assembly system according to the present invention.

With reference now to the drawings, and in particular to FIGS. 1 through 7 thereof, a new HVAC localized air filter assembly system embodying the principles and concepts of the present invention and generally designated by the reference numeral 10 will be described.

Preferably multiple units are used on both the forced air registers of a HVAC system to capture particulate material from the HVAC system before the particulate material enters a room and on the cold air returns of the HVAC system to trap particulate material from the room prior to the particulate material entering the HVAC system through the cold air returns. Both the vent filter assemblies and the register filter assemblies have a similar construction including a frame assembly and a filter assembly. Because of the commonality of the structure both will be discussed and described as air filters "duct" assemblies. After the basic structure common to both assemblies has been disclosed, individual differences in the two structures as described by the present invention will be discussed in more detail, and is supported by the figures As best illustrated in FIGS. 1 through 7, each "duct" assembly includes a frame assembly 20 and a filter assembly 50. The frame assembly 20 is positionable over an heating ventilation and cooling (HVAC) duct. The frame assembly 20 includes a front wall 22 and a perimeter wall 26 extending from the front wall 22. The front wall 22 includes at least one opening 24 for facilitating airflow through the frame assembly 20. The filter assembly 50 is positionable within the frame assembly 20. The filter assembly 50 is designed for capturing particulate matter in air being conducted through the HVAC duct Preferably, the perimeter wall 26 further comprises an opening 28 for facilitating slideably inserting and removing the filter assembly 50 from the frame assembly 20.

In an embodiment the frame assembly 20 further comprises a louver assembly 30 operationally coupled to the perimeter wall 26. The louver assembly 30 is positioned opposite the front wall 22. Thus, the filter assembly 50 is positionable between the front wall 22 and the louver assembly 30. The louver assembly 30 is for selectively inhibiting airflow through the frame assembly 20.

In a further embodiment the louver assembly 30 further comprises a plurality of louver members 32 and a louver actuator 34. The plurality of louver members 32 is operationally coupled to the frame assembly 20. Each one of the louver members 32 is pivotally movable between an open position and a closed position. The open position is defined by a front surface of the louver member 32 being substantially perpendicular to the front wall 22. The closed position is defined by the front surface being substantially parallel to the front wall 22. The louver actuator 34 extends through the frame assembly 20. The louver actuator 34 facilitates pivoting the plurality of louvers members 32 between the open and the closed position. The louver actuator 34 is operationally coupled to the plurality of louver members 32. The louver actuator 34 may be used to position the plurality of louver members 32 in any position between the open and closed position to control an amount of airflow through the frame assembly 20 to facilitate regulation of temperature in a specific installation.

In still a further embodiment the front wall 22 includes a plurality of grate members 36 extending along the opening 24. The plurality of grate members 36 protects the filter assembly from abrasion. The plurality of grate members 36 also inhibits visual observance of the filter assembly 50.

In yet a further embodiment, a monitoring assembly 40 may positioned within the frame assembly 20. The monitoring assembly 40 monitors static pressure behind the filter assembly 50. The monitoring assembly 40 detects when the filter assembly 50 has collected enough particulate matter that operational efficiency of the HVAC system is being impeded and the filter assembly 50 should be replaced. Additionally, an alarm assembly 42 may be operationally coupled to the monitoring assembly 40. The alarm assembly 42 provides a user detectable signal that the filter assembly 50 should be replaced.

In an embodiment the filter assembly 50 further comprises a filter support portion 52 and a filter member 54. The filter support portion 52 is slidably receivable by the frame assembly 20. The filter member 54 is operationally coupled to the filter support portion 52.

In still a further embodiment the filter member 54 has an arcuate cross-section for increasing an effective surface area of the filter member 54.

In still yet a further embodiment the filter member 54 is pleated to further increase the effective surface area of the filter member 54.

Figure 2:
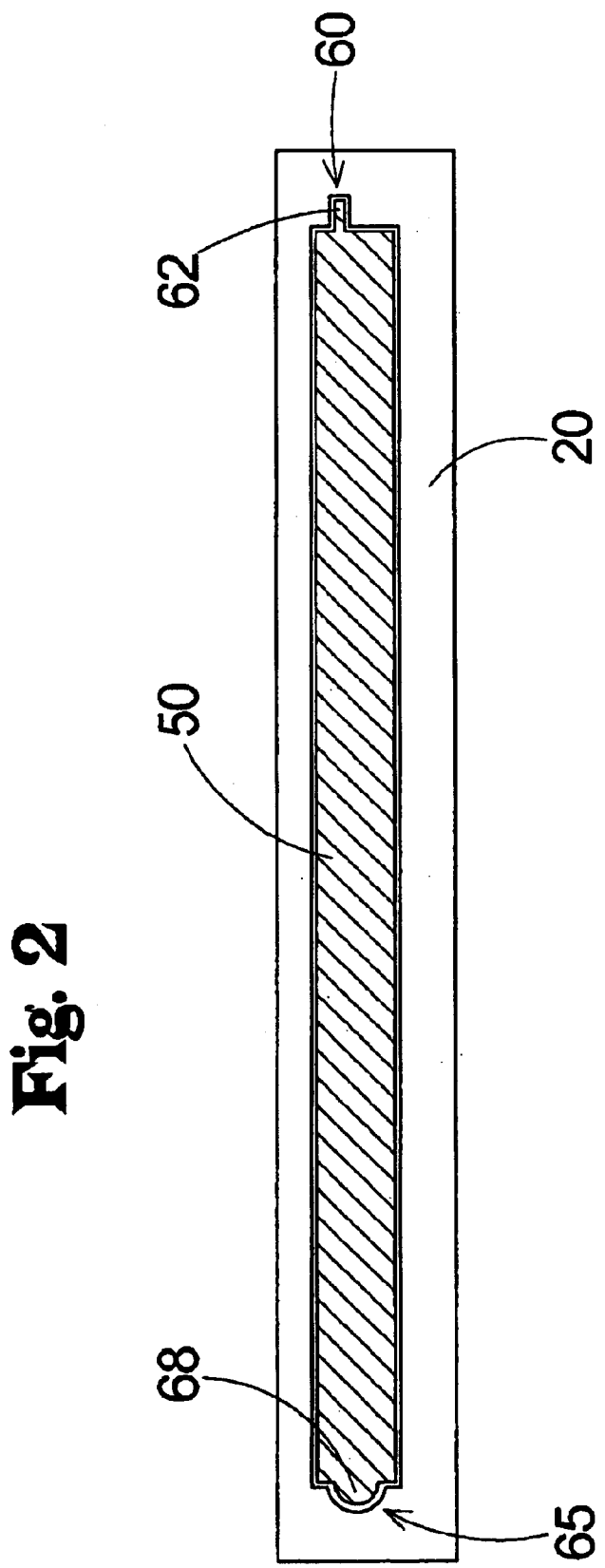
FIG. 2 is a schematic top view of the present invention.
Figure 3:
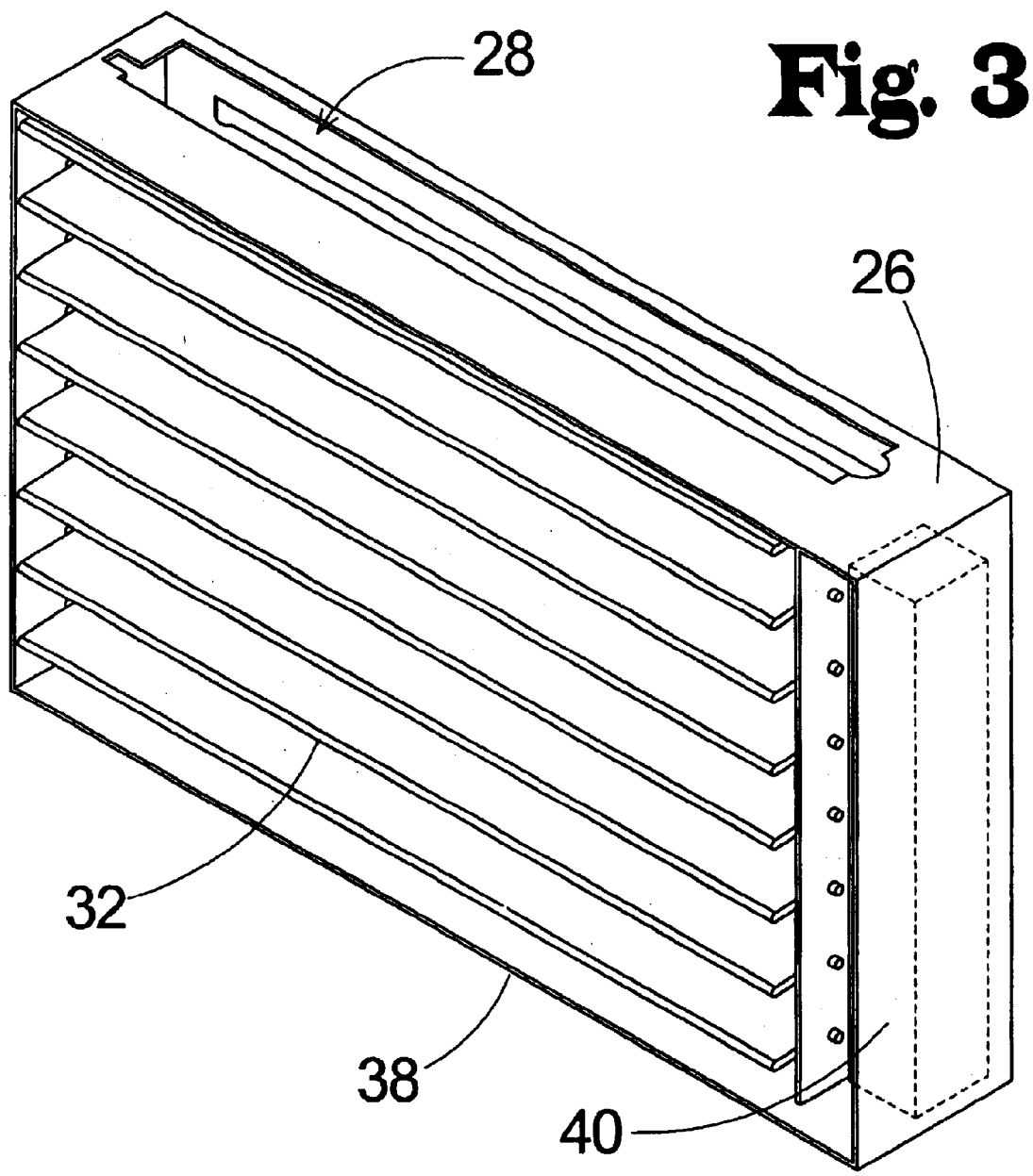
FIG. 3 is a schematic perspective rear view of the present invention.
Figure 4:
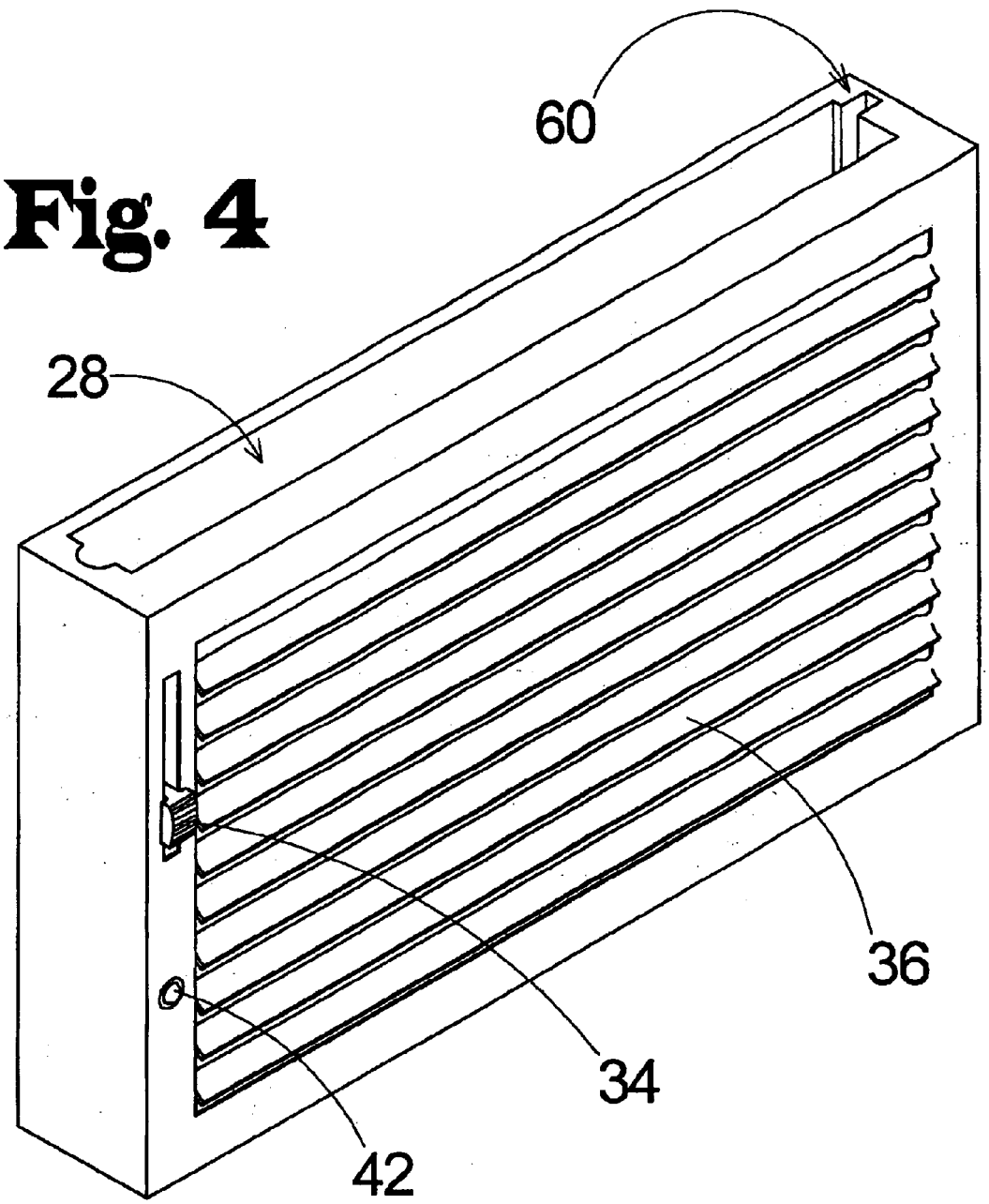
FIG. 4 is a schematic perspective front view of the louver assembly of the present invention.
Figure 5:
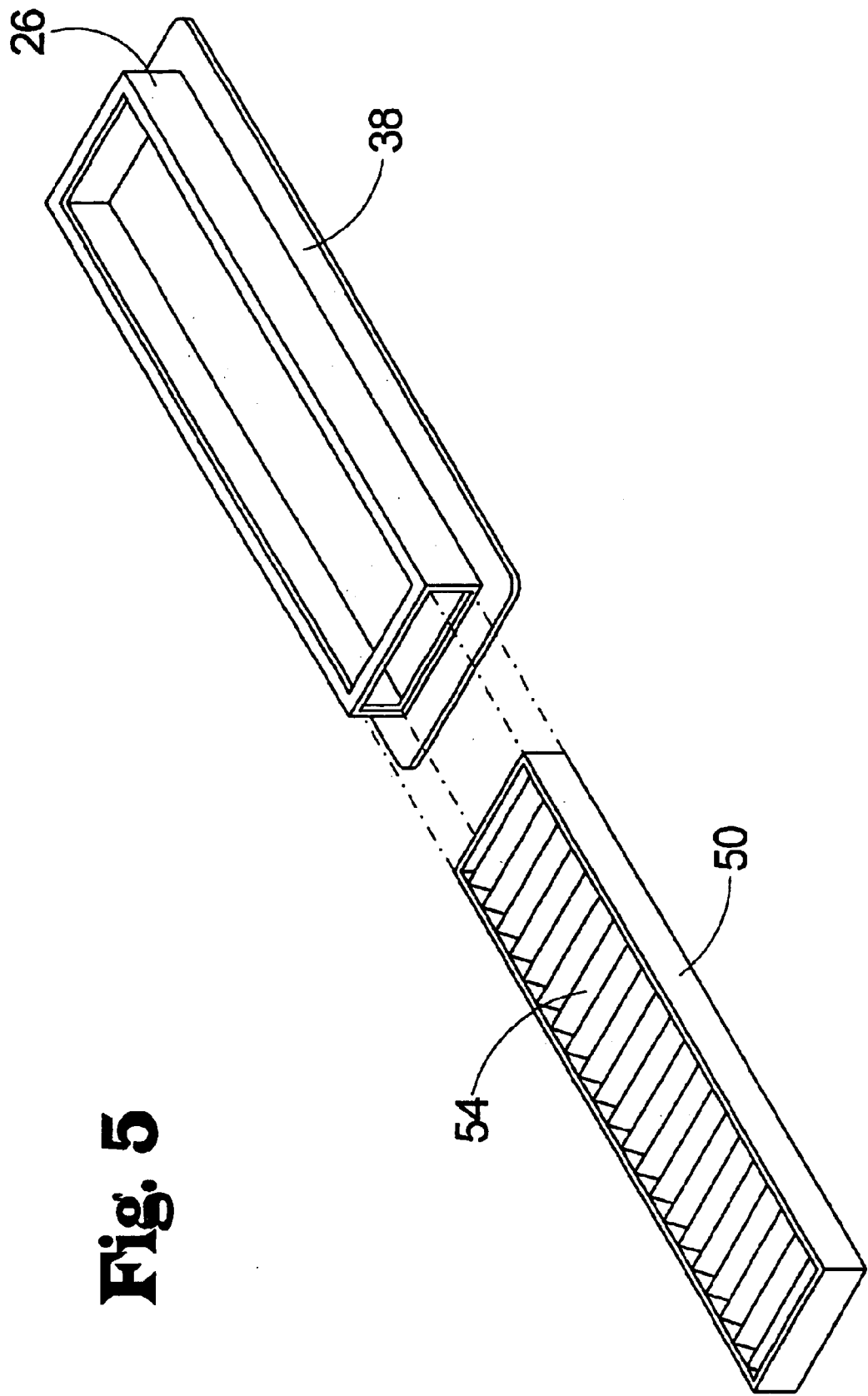
FIG. 5 is a schematic perspective bottom view of an embodiment of the present invention.
Figure 6:
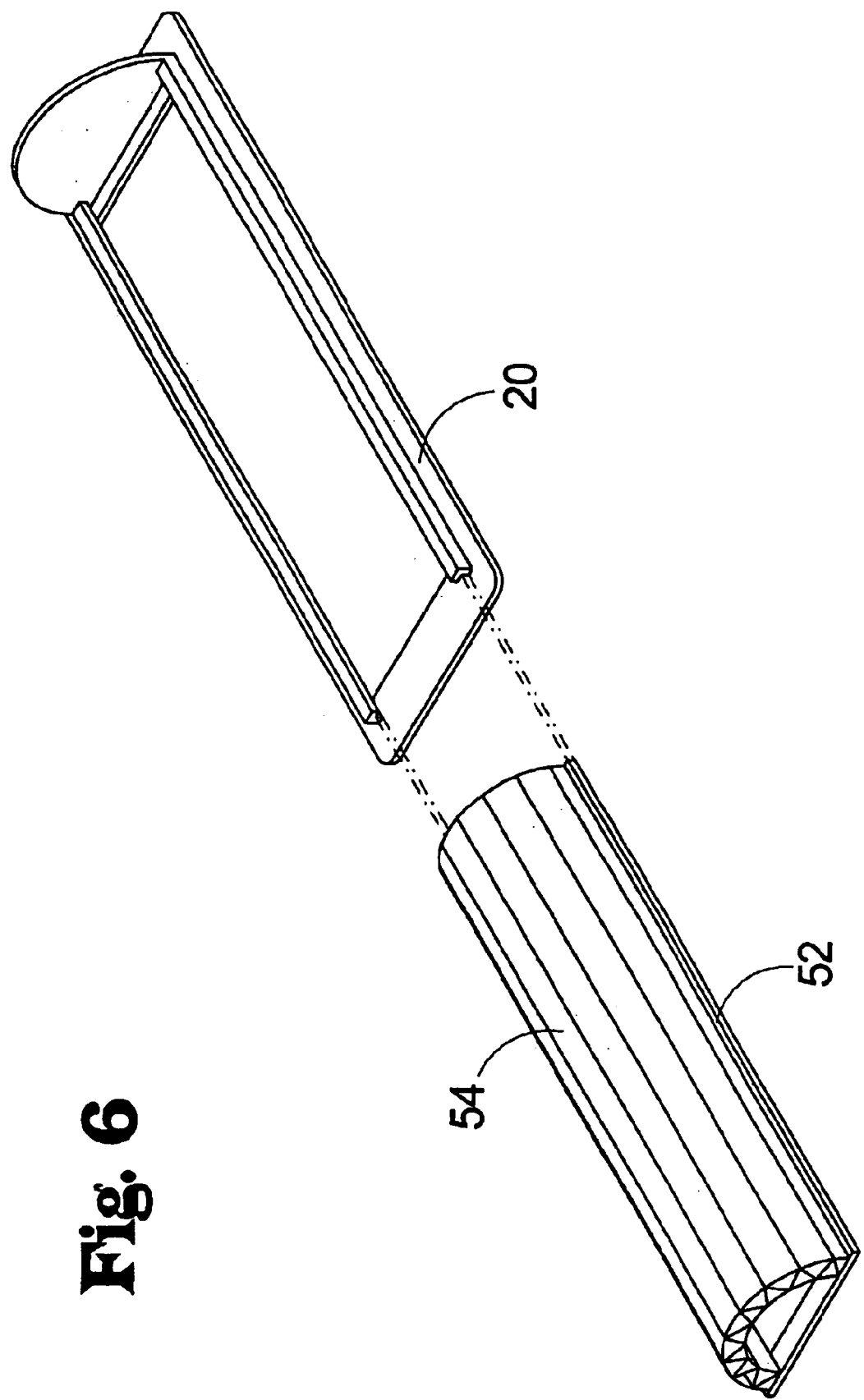
FIG. 6 is a schematic perspective bottom view of the present invention.
Figure 7:
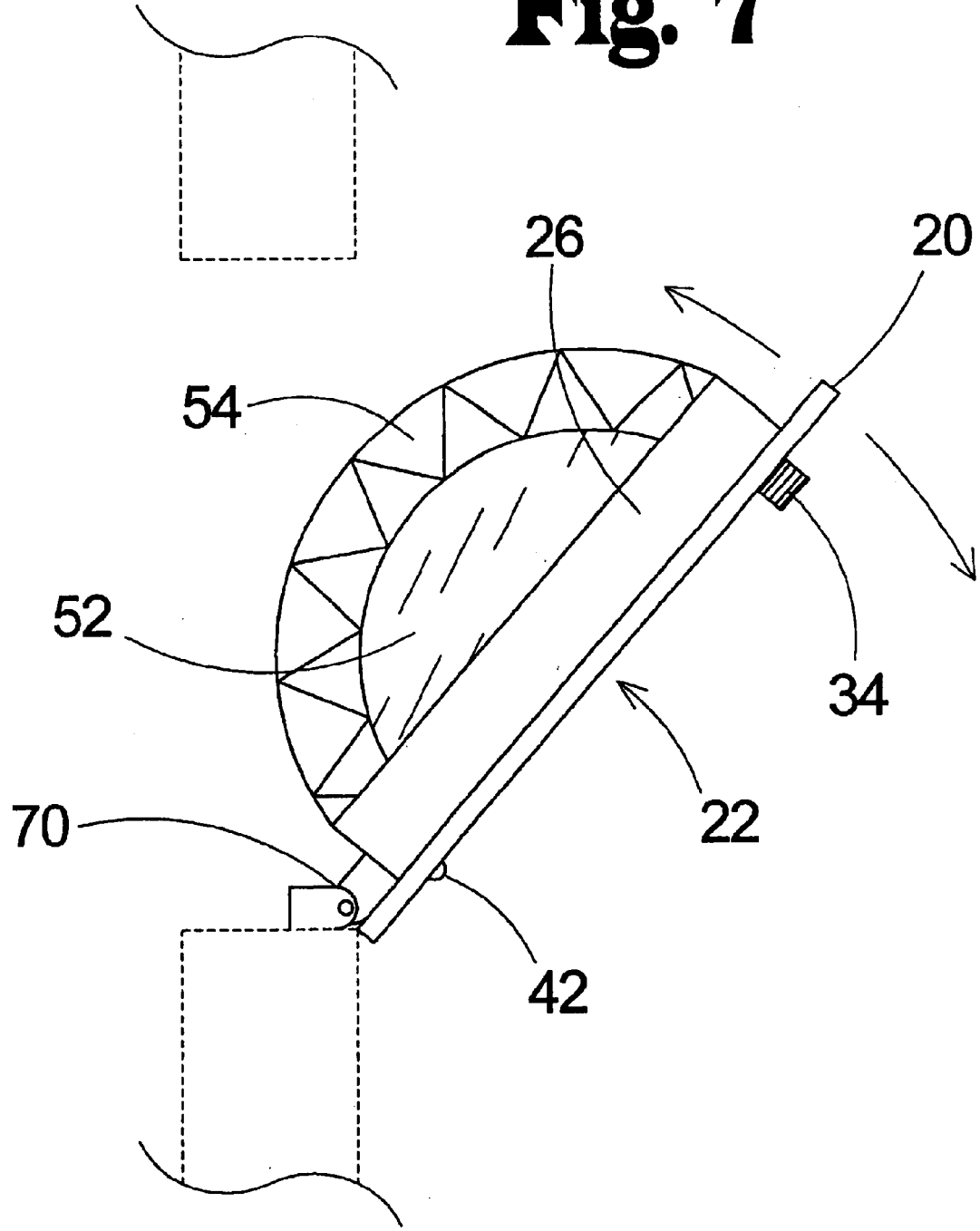
FIG. 7 is a schematic side view of an embodiment of the present invention including the pivot member.

A variety of key/keyway system may be employed to perform multiple functions in the present system 10. The key/keyway system may provide for proper alignment of the filter assembly 50 within the frame assembly 20, may provide a proper selection of a filter type for a specific location by allowing only the proper type of filter to be inserted within the frame assembly 20, and provides a means to limit airflow around the filter assembly 50 by providing a barrier. By way of example only, and not for purposes of limitation, one such key/keyway system includes a slot 60 positioned in a first side of the frame assembly 20 and a corresponding tab 62 extending from a side edge of the filter assembly 50. The tab 62 is slidably receivable in the slot 60 of the frame assembly 20. Such a system would inhibit placing the filter assembly 50 within the frame assembly 20, backwards, but would not necessarily inhibit placing the filter assembly 50 in the frame assembly 50 upside down. If the slot 60 and tab 62 were positioned off of a center alignment, as shown in FIG. 2, then placement of the filter assembly 50 upside down would also be inhibited. Alternately a second key/keyway system could be employed on the opposite side of the filter assembly 50 and frame assembly 20.

In a further embodiment, this second key/keyway system may include the frame assembly 20 having a lower keyed portion 64 and an upper keyway portion 65. The lower keyed portion 64 is operationally coupled to a side of the frame assembly 20. The upper keyway 65 is substantially aligned with the lower keyed portion 64. Similarly, the filter assembly 50 also includes a lower keyway 67 and an upper keyed portion 68. The filter 50 is slidably positionable within the frame assembly 20. Thus, the filter assembly lower keyway 67 slideably receives the frame assembly lower keyed portion 64 and the filter assembly upper keyed portion 68 is slideably received by the frame assembly upper keyway 65. The filter assembly lower keyway 67 and upper keyed portion 68 and the frame assembly lower keyed portion 64 and upper keyway 65 form an alignment combination facilitating proper alignment of the filter assembly 50 within the frame assembly 20 with respect to front to back orientation and side to side orientation. The alignment combination inhibits placement of the filter assembly 50 upside-down in the frame assembly 20. The alignment combination also inhibits placement of the filter assembly 50 facing backwards into the frame assembly 20.

Because of the variety of mounting locations and the varying degree of accessibility to the system 10 available upon installation, a further embodiment of the present invention may include a pivot member 70. The pivot member 70 is preferably operationally coupled to the frame assembly 20. The pivot member 70 is also couplable to the structure. Thus, the pivot member 70 may be used to facilitate coupling the frame assembly 20 to the structure and to allow the system 10 to pivot between an in use position abutting a surface of the structure and a maintenance position tilted away from the surface of the structure.

Now addressing the peculiarities of the vent version of the "duct" filter assembly, the frame assembly 20 is designed for operationally coupling to a cold air return for the HVAC system. Thus, the filter assembly 50 captures particulate material from a room prior to the particulate material entering the HVAC system. The opening 28 in the perimeter wall 26 is preferably positioned on a side of the frame assembly 20 to facilitate insertion and removal of the filter assembly 50 from the frame assembly 50 without manipulating the frame assembly 50.

Alternately for the register version of the "duct" filter assembly, the frame assembly 20 is designed for coupling to a forced air registers for the HVAC system. Thus, the filter assembly 50 captures particulate material from the HVAC system prior to the particulate material entering a room. The front wall 22 includes a perimeter lip 38 extending outwardly from the front wall 22. The perimeter lip 38 abuts a surface of a structure. The surface of the structure may be a floor or a wall. The perimeter wall 26 is positionable within the forced air register, giving a more flush appearance for the frame assembly 20. The opening 28 in the perimeter wall 26 is positioned on a side portion for facilitating insertion and removal of the filter assembly 50 with respect to the frame assembly 20.

As discussed above, preferably multiple units are used on both the forced air registers of a HVAC system to capture particulate material from the HVAC system before the particulate material enters a room and on the cold air returns of the HVAC system to trap particulate material from the room prior to the particulate material entering the HVAC system through the cold air returns. However, the user may observe significant benefits if even one unit is installed and used singly.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A room ventilation filtration system for capturing particulate matter in conjunction with a conventional forced air heating, ventilation and cooling system, comprising:
   at least one frame assembly positionable over a heating ventilation and cooling (HVAC) duct, said frame assembly having a front wall and a perimeter wall extending from said front wall, said front wall having at least one opening for facilitating airflow through said frame assembly;
   at least one filter assembly positionable within said frame assembly, said filter assembly being adapted for capturing particulate matter in ambient air being conducted through said HVAC duct;
   wherein said frame assembly includes at least one key portion for facilitating mating with said filter assembly; and
   wherein said filter assembly includes at least one key portion for facilitating mating with said frame assembly, said key portion being slideably received by said keyway, said key and keyway insuring proper orientation of said filter assembly within said frame assembly.

2. The system of claim 1, wherein said perimeter wall further comprises an opening for facilitating slideably inserting and removing said filter assembly from said frame assembly.

3. The system of claim 1, wherein said frame assembly further comprises a louver assembly operationally coupled to said perimeter wall, said louver assembly being positioned opposite said front wall whereby said filter assembly is positionable between said front wall and said louver assembly, said louver assembly being for selectively inhibiting airflow through said frame assembly.

4. The system of claim 3, wherein said louver assembly further comprises:
   a plurality of louver members operationally coupled to said frame assembly, each one of said louver members being pivotally movable between an open position and a closed position, said open position being defined by a front surface of said louver member being substantially perpendicular to said front wall, said closed position being defined by said front surface being substantially parallel to said front wall;
   a louver actuator extending through said frame assembly, said louver actuator facilitating pivoting said plurality of louvers between said open and said closed position, said louver actuator being operationally coupled to said plurality of louver members.

5. The system of claim 1, wherein said front wall having a plurality of grate members extending along said opening, said plurality of grate members protecting said filter assembly from abrasion, said plurality of grate members inhibiting visual observance of said filter assembly.

6. The system of claim 1, further comprising:
   wherein said filter assembly includes at least one keyway for facilitating mating with said frame assembly; and
   wherein said frame assembly includes at least one key portion for facilitating mating with said filter assembly, said key portion being slideably received by said keyway, said key and keyway insuring proper orientation of said filter assembly within said frame assembly.

7. The system of claim 1, further comprising a monitoring assembly, positioned within said frame assembly, said monitoring assembly monitoring static pressure behind said filter assembly, said monitoring assembly detecting when said filter assembly has collected enough particulate matter that operational efficiency of the HVAC system is being impeded and said filter assembly should be replaced.

8. The system of claim 7, further comprising an alarm assembly operationally coupled to said monitoring assembly, said alarm assembly providing a user detectable signal that said filter assembly should be replaced.

9. A room ventilation filtration system for capturing particulate matter in conjunction with a conventional forced air heating, ventilation and cooling system, comprising:
   at least one frame assembly positionable over a heating ventilation and cooling (HVAC) duct, said frame assembly having a front wall and a perimeter wall extending from said front wall, said front wall having at least one opening for facilitating airflow through said frame assembly;
   at least one filter assembly positionable within said frame assembly, said filter assembly being adapted for capturing particulate matter in ambient air being conducted through said HVAC duct;
   wherein said perimeter wall further comprises an opening for facilitating slideably inserting and removing said filter assembly from said frame assembly;
   wherein said frame assembly further comprises a louver assembly operationally coupled to said perimeter wall, said louver assembly being positioned opposite said front wall whereby said filter assembly is positionable between said front wall and said louver assembly, said louver assembly being for selectively inhibiting airflow through said frame assembly;
   wherein said louver assembly further comprises:
      a plurality of louver members operationally coupled to said frame assembly, each one of said louver members being pivotally movable between an open position and a closed position, said open position being defined by a front surface of said louver member being substantially perpendicular to said front wall, said closed position being defined by said front surface being substantially parallel to said front wall;

a louver actuator extending through said frame assembly, said louver actuator facilitating pivoting said plurality of louvers between said open and said closed position, said louver actuator being operationally coupled to said plurality of louver members;

wherein said front wall having a plurality of grate members extending along said opening, said plurality of grate members protecting said filter assembly from abrasion, said plurality of grate members inhibiting visual observance of said filter assembly;

wherein said frame assembly includes at least one keyway for facilitating mating with said filter assembly; and wherein said filter assembly includes at least one key portion for facilitating mating with said frame assembly, said key portion being slideably received by said keyway, said key and keyway insuring proper orientation of said filter assembly within said frame assembly;

a monitoring assembly, positioned within said frame assembly, said monitoring assembly monitoring static pressure behind said filter assembly, said monitoring assembly detecting when said filter assembly has collected enough particulate matter that operational efficiency of the HVAC system is being impeded and said filter assembly should be replaced; and an alarm assembly operationally coupled to said monitoring assembly, said alarm assembly providing a user detectable signal that said filter assembly should be replaced.

10. The system of claim 9, wherein said frame assembly being adapted for being operationally coupled to a cold air return for the HVAC system whereby said filter assembly captures particulate material from a room prior to the particulate material entering the HVAC system.

11. The system of claim 10, wherein said opening in said perimeter wall being positioned on a side of said frame assembly to facilitate insertion and removal of said filter assembly from said frame assembly without manipulating said frame assembly.

12. The system of claim 9, wherein said frame assembly being adapted for coupling to a forced air register for the HVAC system whereby said filter assembly captures particulate material from said HVAC system prior to the particulate material entering a room.

13. The system of claim 12, wherein said front wall having a perimeter lip extending outwardly from said front wall, said perimeter lip abutting a surface of a structure, said perimeter wall being positionable within said forced air register.

14. The system of claim 13 wherein said opening in said perimeter wall being positioned on a side portion of said wall for facilitating insertion and removal of said filter assembly with respect to said frame assembly.

15. The system of claim 9, wherein said filter assembly further comprises a filter support portion and a filter member, said filter support portion being slidably receivable by said frame assembly, said filter member being operationally coupled to said filter support portion.

16. The system of claim 15, wherein said filter member having a arcuate cross-section for increasing an effective surface area of said filter member.

17. The system of claim 15, wherein said filter member being pleated to increase an effective surface area of said filter member.

18. The system of claim 1 further comprising:

wherein said frame assembly includes a lower keyed portion and an upper keyway portion, said lower keyed portion being operationally coupled to a side of said frame assembly, said upper keyway being substantially aligned with said lower keyed portion;

wherein said filter assembly includes a lower keyway and an upper keyed portion, said filter being slidably positionable within said frame assembly whereby said filter assembly lower keyway slideably receives said frame assembly lower keyed portion and said filter assembly upper keyed portion is slideably received by said frame assembly upper keyway; and said filter assembly lower keyway and upper keyed portion and said frame assembly lower keyed portion and upper keyway forming an alignment combination facilitating proper alignment of said filter assembly within said frame assembly with respect to front to back orientation and side to side orientation, said alignment combination inhibiting placement of said filter assembly upside-down in said frame assembly, said alignment combination inhibiting placement of said filter assembly facing backwards into said frame assembly.

19. The system of claim 1 further comprising:

a plurality of register filter assemblies, each one of said register filter assemblies being couplable to a forced air register of a HVAC system;

a plurality of vent filter assemblies, each one of said vent filter assemblies being positionable over a cold air return of the HVAC system;

wherein each one of said plurality of register assemblies further comprises:

a register frame assembly positionable over a forced air register of a HVAC system, said register frame assembly having a register front wall and a register perimeter wall extending from said register front wall, said register front wall having at least one register opening for facilitating airflow through said register frame assembly, said register perimeter wall having an register wall opening for facilitating slideably inserting and removing said register filter assembly from said register frame assembly;

a register filter assembly positionable within said register frame assembly, said register filter assembly being adapted capturing particulate matter in ambient air being conducted through said HVAC forced air register wherein said register frame assembly further comprises a register louver assembly operationally coupled to said register perimeter wall, said register louver assembly being positioned opposite said register front wall whereby said register filter assembly is positionable between said register front wall and said register louver assembly, said register louver assembly being for selectively inhibiting airflow through said register frame assembly;

wherein said register louver assembly further comprises:

a plurality of register louver members operationally coupled to said register frame assembly, each one of said register louver members being pivotally movable between an open position and a closed position, said open position being defined by a register front surface of said register louver member being substantially perpendicular to said register front wall, said closed position being defined by said register front surface being substantially parallel to said register front wall;

a register louver actuator extending through said register frame assembly, said register louver actuator facilitating pivoting said plurality of register louvers between said open and said closed position, said register louver actuator being operationally coupled to said plurality of register louver members;

said register front wall having a plurality of register grate members extending along said register opening, said plurality of register grate members protecting said register filter assembly from abrasion, said plurality of grate members inhibiting visual observance of said register filter assembly;

said register frame assembly includes at least one keyway for facilitating mating with said register filter assembly;

said register filter assembly includes at least one key portion for facilitating mating with said register frame assembly, said key portion being slideably received by said keyway, said key and keyway insuring proper orientation of said register filter assembly within said register frame assembly;

wherein each one of said plurality of assemblies further comprises:

a vent frame assembly positionable over a cold air return of a HVAC system, said vent frame assembly having a vent front wall and a vent perimeter wall extending from said vent front wall, said vent front wall having at least one vent opening for facilitating airflow through said vent frame assembly, said vent perimeter wall having an vent wall opening for facilitating slideably inserting and removing said vent filter assembly from said vent frame assembly;

a vent filter assembly positionable within said vent frame assembly, said vent filter assembly being adapted for capturing particulate matter in ambient air being conducted through the HVAC cold air return;

wherein said vent frame assembly further comprises a vent louver assembly operationally coupled to said vent perimeter wall, said vent louver assembly being positioned opposite said vent front wall whereby said vent filter assembly is positionable between said vent front wall and said vent louver assembly, said vent louver assembly being for selectively inhibiting airflow through said vent frame assembly;

wherein said vent louver assembly further comprises:

a plurality of vent louver members operationally coupled to said vent frame assembly, each one of said vent louver members being pivotally movable between an open position and a closed position, said open position being defined by a vent front surface of said vent louver member being substantially perpendicular to said vent front wall, said closed position being defined by said vent front surface being substantially parallel to said vent front wall;

a vent louver actuator extending through said vent frame assembly, said vent louver actuator facilitating pivoting said plurality of vent louvers between said open and said closed position, said vent louver actuator being operationally coupled to said plurality of vent louver members;

said vent front wall having a plurality of vent grate members extending along said vent opening, said plurality of vent grate members protecting said vent filter assembly from abrasion, said plurality of grate members inhibiting visual observance of said vent filter assembly;

said vent frame assembly includes at least one keyway for facilitating mating with said vent filter assembly; and said vent filter assembly includes at least one key portion for facilitating mating with said vent frame assembly, said key portion being slideably received by said keyway, said key and keyway insuring proper orientation of said vent filter assembly within said vent frame assembly.

* * * * *